J. WOOD, Jr.
PISTON.

No. 180,979.　　　　　　　　　　　Patented Aug. 8, 1876.

WITNESSES:
H. Rydquist.
John Goethals.

INVENTOR:
J. Wood Jr
BY
Munn
ATTORNEYS.

UNITED STATES PATENT OFFICE.

JOHN WOOD, JR., OF CONSHOHOCKEN, PENNSYLVANIA.

IMPROVEMENT IN PISTONS.

Specification forming part of Letters Patent No. 180,979, dated August 8, 1876; application filed June 6, 1876.

*To all whom it may concern:*

Figure 1:
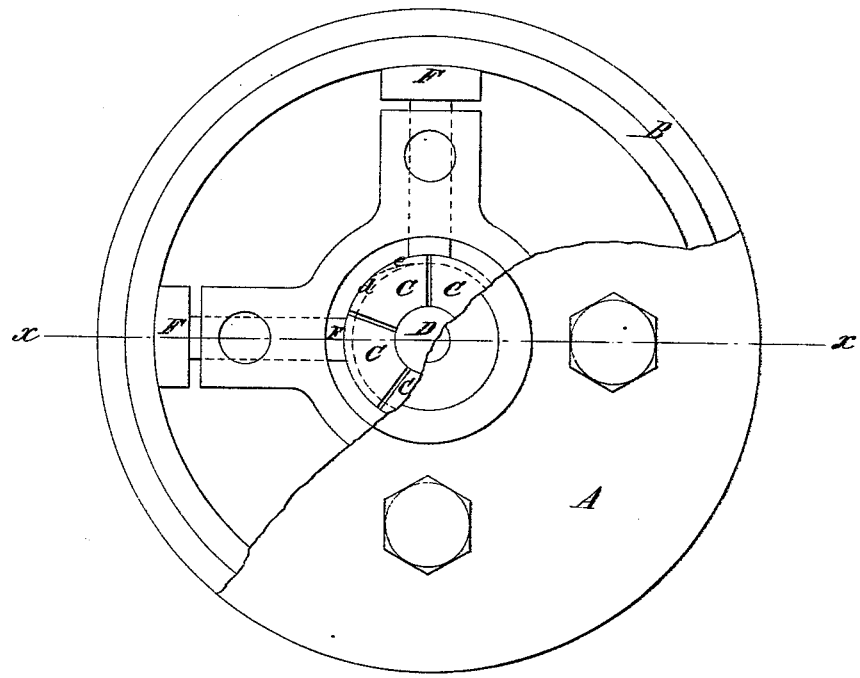
Figure 2:
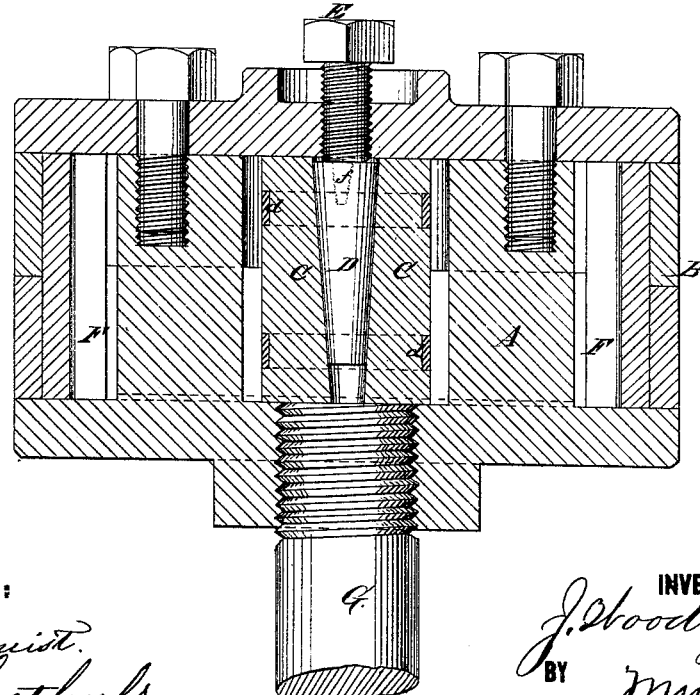

Be it known that I, JOHN WOOD, Jr., of Conshohocken, in the county of Montgomery and State of Pennsylvania, have invented a new and useful Improvement in Pistons, of which the following is a specification:

Figure 1 is a plan. Fig. 2 is a section on line $x\ x$ in Fig. 1.

Similar letters of reference indicate corresponding parts.

The object of my invention is to provide a universal expanding device for the pistons of steam-engines, which is capable of expanding the packing-rings equally with a positive motion, so that, while the piston can be adjusted when desirable, it acts, while working, like a solid piston.

My invention consists in the combination of followers sliding in suitable radial ways in the piston-head, with a central sectional core or cylinder, which is bored out conically, and is provided with a conical plug, which, when forced into the sectional core, by means of a screw placed in the piston-head for that purpose, expands it, forcing the followers against the packing-rings.

A is a piston-head, provided with ordinary packing rings B. C is a core or cylinder, which is made up of segments c, which are held together by a circular spring or springs, d, which are placed in grooves in the exterior of the core. These springs are split or lapped at e. The core C is bored out conically to receive a conical plug or tapper-pin, D. A set-screw, E, is fitted in the piston-head, which is capable of forcing the plug D into the core C. At F are followers which slide in radial ways in the piston-head, and abut upon the core C, and are provided with feet at their outer ends, which press against the rings B. The plug D may be withdrawn by removing the screw E, and screwing a rod or bolt into the plug D at f. The piston-rod G, which ordinarily passes through the piston, is screwed into a boss cast on one side of the head for that purpose.

The advantages claimed for my improvement are, that while the piston can be adjusted to take up the usual wear, it will accommodate itself to the inequalities in the cylinder, and will not wear more in one place than in another, as is the case with packing which adjusts itself. Another important advantage is that it obviates the necessity of removing the follower to adjust the packing.

Having thus described my invention, I claim as new and desire to secure by Letters Patent—

The combination, with the core of segmental block C, and the arms F, of the split ring or rings d, and conical plug D, arranged substantially as and for the purpose specified.

JOHN WOOD, JR.

Witnesses:
JAMES W. WOOD,
W. STEMPE,
JOHN J. NICHOLSON.